United States Patent
Shaharabany et al.

(10) Patent No.: US 11,199,997 B2
(45) Date of Patent: *Dec. 14, 2021

(54) STORAGE DEVICE OPERATIONS USING A DIE TRANSLATION TABLE

(71) Applicant: Western Digital Technologies, Inc., San Jose, CA (US)

(72) Inventors: Amir Shaharabany, Kochav Yair (IL); Hadas Oshinsky, Kfar Saba (IL)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 121 days.

This patent is subject to a terminal disclaimer.

(21) Appl. No.: 16/748,795

(22) Filed: Jan. 21, 2020

(65) Prior Publication Data

US 2020/0192606 A1 Jun. 18, 2020

Related U.S. Application Data

(62) Division of application No. 15/721,272, filed on Sep. 29, 2017, now Pat. No. 10,564,891.

(51) Int. Cl.
*G06F 12/00* (2006.01)
*G06F 3/06* (2006.01)
*G06F 12/10* (2016.01)

(52) U.S. Cl.
CPC ............ *G06F 3/0659* (2013.01); *G06F 3/061* (2013.01); *G06F 3/0604* (2013.01); *G06F 3/064* (2013.01); *G06F 3/0613* (2013.01); *G06F 3/0653* (2013.01); *G06F 3/0658* (2013.01); *G06F 3/0673* (2013.01); *G06F 3/0679* (2013.01); *G06F 12/10* (2013.01); *G06F 2212/657* (2013.01)

(58) Field of Classification Search
CPC .... G06F 3/0659; G06F 3/0604; G06F 3/0673; G06F 12/10; G06F 2212/657; G06F 12/0238; G06F 12/0246
See application file for complete search history.

(56) References Cited

U.S. PATENT DOCUMENTS

| | | | |
|---|---|---|---|
| 10,564,891 B2* | 2/2020 | Shaharabany | G06F 3/0604 |
| 2013/0031330 A1* | 1/2013 | Jones | G06F 13/385 |
| | | | 711/206 |
| 2015/0356048 A1* | 12/2015 | King | G06F 13/36 |
| | | | 710/308 |
| 2016/0162215 A1 | 6/2016 | Jayaraman et al. | |
| 2016/0306553 A1 | 10/2016 | Ellis et al. | |
| 2017/0123726 A1 | 5/2017 | Sinclair et al. | |

* cited by examiner

*Primary Examiner* — Shawn X Gu
(74) *Attorney, Agent, or Firm* — Patterson & Sheridan, LLP; Steven H. Versteeg

(57) ABSTRACT

In one non-limiting embodiment, a method is disclosed for performing a storage device operation on a die is provide having steps of choosing a storage device operation to perform, estimating which die is related to the storage device operation chosen to be performed and performing the storage device operation at the die based on the estimating.

17 Claims, 3 Drawing Sheets

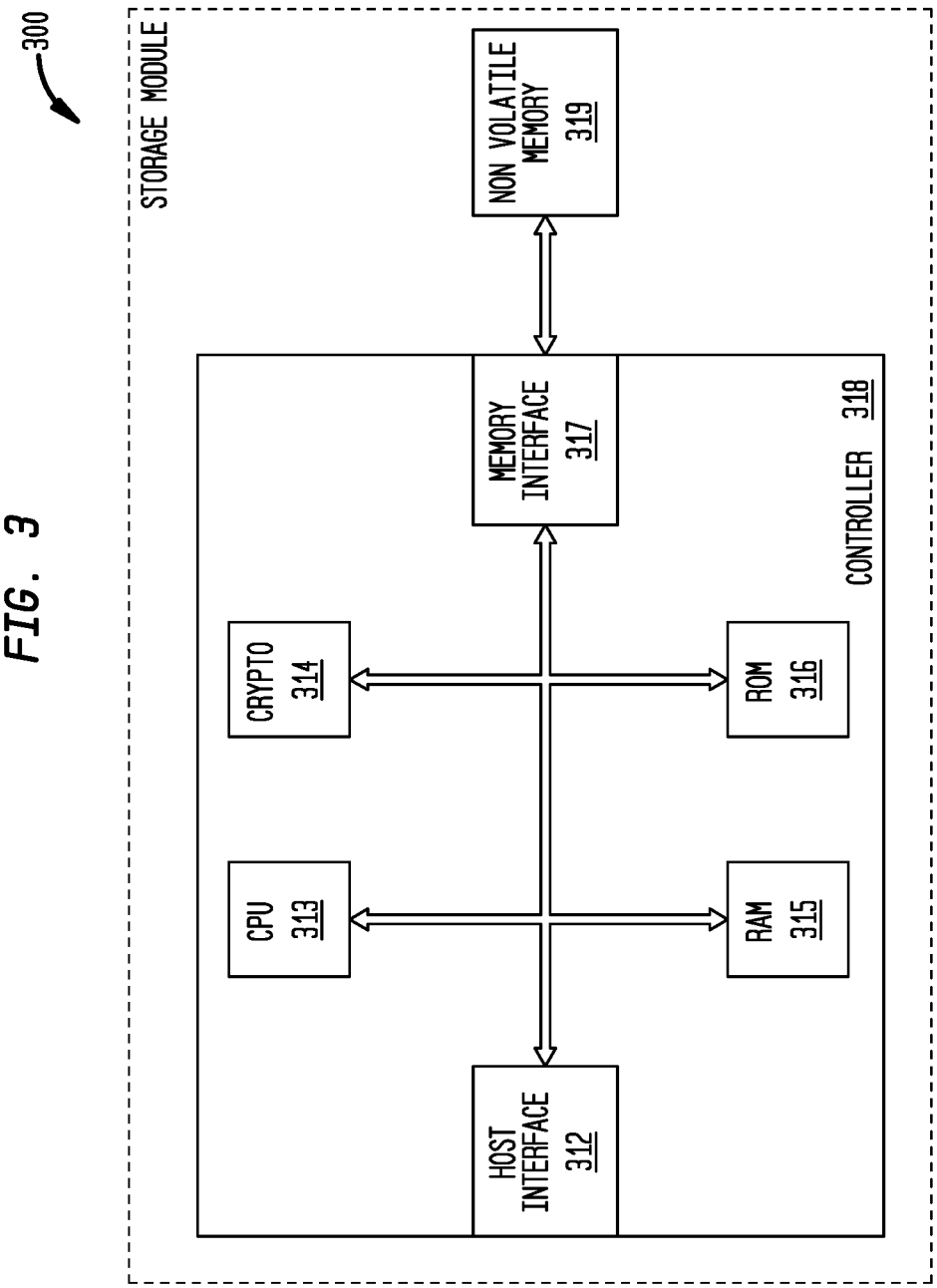

STORAGE DEVICE OPERATIONS USING A DIE TRANSLATION TABLE

CROSS-REFERENCE TO RELATED APPLICATIONS

This application is a divisional of U.S. patent application Ser. No. 15/721,272, now U.S. Pat. No. 10,564,891, filed Sep. 29, 2017, which is herein incorporated by reference.

FIELD

Aspects of the disclosure relate to anticipating actions performed on a storage device, such as reading data in a data storage mechanism. More specifically, aspects of the disclosure relate to providing a die translation table to enable the storage device to estimate a die number in the NAND array for future actions of a computer storage device in order to increase computer efficiency.

BACKGROUND

Field

Random read benchmark performance accounts for parallelism in the execution of read commands in the storage device, initiated by a host, such as a computer or server. The host may issues commands to send and receive data from a data storage device. The data storage device may solid state drive (SSD) or other memory configuration that allows a user to send and receive information for processing and comprised of storage array that is divided to dies. Conventionally, systems that are used in the manner do not fully utilize the inherent storage device parallelism architecture as the software used to control the hardware is not optimal. Hosts and component manufacturers desired to increase storage device performance to the maximum amounts possible to allow user experience to be improved. Latency or operation lag during storage device operations is attempted to be minimized wherever possible.

In storage devices, the read location for data is obtained according to a translation of the physical location. This physical location was obtained and memorized during a previous write operation. Once a command logical based address translation is performed, the read operation is scheduled to a designated die (corresponding to the desired physical address). After many read operations are scheduled, it can be observed that many die operations are not equal under some circumstances. Storage Devices have several die that perform such writing and reading functions on a memory array. Often several operations (reads) are scheduled to few dies while other dies perform no operations at all. Such actions are not efficient and should be avoided as these serially performed actions "stack up" and wait to be performed. During times when dies are not active, it would be advantageous to have these dies perform necessary functions instead of being idle. Conventional systems and methods of data operations often have these problems of having some dies being overworked, while other dies are not used, therefore the inherent parallelism in the Storage Device is not used to the fullest extent.

From a numerical perspective, die operations are not equal between different dies when the queue depth (QD), defined as the amount of read commands provided by the host to execute in parallel, is similar to the number of dies. As a result, when the read commands provided to the die configuration equals or is nearly equal to the number of dies, parallelism execution is compromised and the more inefficient the executed read commands are performed as there is time lag associated with execution of serial commands. For activities where there is a limited number of read commands, there is a high probability of some dies having stacked operations while other dies are idle. Thus, for a small number of write operations, there is a high likelihood of some dies being sufficiently busy, while other dies are inactive.

Adding to the above problem, conventional algorithms and systems do not reorder host commands for specific dies because the destination dies are only known by performing a translation process. Since commands are not reordered, the commands initiated by the host are executed in the order generated by the controller of a memory device and die parallelism is only achieved by the sheer volume of commands placed to the dies on the hope that different dies will be utilized at the same time. Again, as provided above, when the number of commands is low, parallelism is not optimized and the overall efficiency is compromised.

There is a need to provide a method and system that will allow for quick and easy estimation of die activities so that operations at all of the dies can be scheduled to allow for greater overall efficiency and parallel operations can be performed.

SUMMARY OF THE DISCLOSURE

In one non-limiting embodiment, a method is disclosed for performing a storage device operation on a storage device die having steps of choosing a storage device operation to perform, estimating which storage device die is related to the storage device operation chosen to be performed based on a look-up table and a formula using a die alignment, a logical based address and a die count, and performing the storage device operation at the die based on the estimating.

In another non-limiting embodiment, an apparatus is disclosed for performing a storage device operation is disclosed having means for choosing a storage device operation to perform, means for estimating which storage device die is related to the storage device operation chosen to be performed and means for performing the storage device operation at the die based on the estimating.

In another non-limiting embodiment, a method is disclosed for performing a storage device operation on a storage device die is disclosed having steps of choosing a storage device operation to perform, estimating which storage device die is related to the storage device operation chosen to be performed and checking if the storage device die estimated for the storage device operation is idle.

In another non-limiting embodiment, a method is disclosed to estimate a die value used for completion of a storage device request for a set of data having an entry value, a best distance value and a best entry value is disclosed having steps of calculating a distance of the set of data to end values in a die table, comparing the distance calculated to the best distance value, setting the best distance value equal to the distance value when the distance of the set of data is less than the best distance value, setting the best entry value equal to the entry value when the distance is less than the best distance value, comparing the entry value to a table size, repeating the calculation of the distance value when the entry value is less than the table size and calculating the die value of the set of data according to a formula.

In another non-limiting embodiment, a method is disclosed for updating a die translation table in a memory of a storage device is disclosed, comprising steps of obtaining set of values pertaining to a set of data for updating to a die translation table, wherein the set of values includes an entry value, a command LBA value, an isHit value, and a cmdFirstDie value, obtaining a dieAlignment value of the die translation table, setting a value of cmdFirstLBA equal to the command LBA value−commandLBA % dieAlignment, comparing the isHit value to a true value, comparing the cmdFirstLBA to entry.lastLBA and adding a new entry to the die translation table in the memory of the storage device of the cmdFirstLBA and cmdFirstDie when a value of the cmdFirstLBA is greater than the entry.lastLBA.

In another non-limiting embodiment, a method is disclosed for updating a die translation table in a memory of a storage device is disclosed having steps of obtaining set of values pertaining to a set of data for updating to a die translation table, wherein the set of values includes an entry value, a command LBA value, an isHit value, and a cmdFirstDie value, obtaining a dieAlignment value of the die translation table, setting a value of cmdFirstLBA equal to the command LBA value−commandLBA % dieAlignment, comparing the isHit value to a true value, comparing the cmdFirstLBA to entry.lastLBA, comparing the cmdFirstLBA to entry.firstLBA, setting the value of entry.firstLBA equal to cmdFirstLBA when the cmdFirstLBA is not less than the value of entry.firstLBA and adding a new entry to the die translation table in the memory of the storage device of the cmdFirstLBA and cmdFirstDie.

In another non-limiting embodiment a method is disclosed for updating a die translation table in a memory of a storage device is disclosed having steps of obtaining set of values pertaining to a set of data for updating to a die translation table, wherein the set of values includes an entry value, a command LBA value, an isHit value, and a cmdFirstDie value, obtaining a dieAlignment value of the die translation table, setting a value of cmdFirstLBA equal to the command LBA value−commandLBA % dieAlignment, comparing the isHit value to a true value, comparing the cmdFirstLBA value to a value of entry.lastLBA and setting a value of entry.LastLBA equal to cmdFirstLBA when CMDFirst LBA is greater than entry.lastLBA and the isHit value equals the true value and updating the die translation table in the storage device memory with at least the entry.LastLBA.

In another non-limiting embodiment, a method is disclosed for updating a die translation table in a memory of a storage device is disclosed having steps of obtaining set of values pertaining to a set of data for updating to a die translation table, wherein the set of values includes an entry value, a command LBA value, an isHit value, and a cmdFirstDie value, obtaining a dieAlignment value for the die translation table, setting a value of cmdFirstLBA equal to the command LBA value−commandLBA % dieAlignment, comparing the isHit value to a true value, comparing the cmdFirstLBA to entry.lastLBA when the isHit value is true, comparing the value of cmdFirstLBA with entry.firstLBA when the isHit value is true, setting the value of entry.firstLBA equal to cmdFirstLBA and entry.firstDie equal to cmdFirstDie when cmdFirstLBA is less than the value of entry.firstLBA when the isHit value is true and updating the die translation table in the memory of the storage device with the entry.firstLBA and entry.firstDie values.

Other aspects and advantages will become apparent from the following description and the attached claims.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3 is an arrangement configured to perform the methods described.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
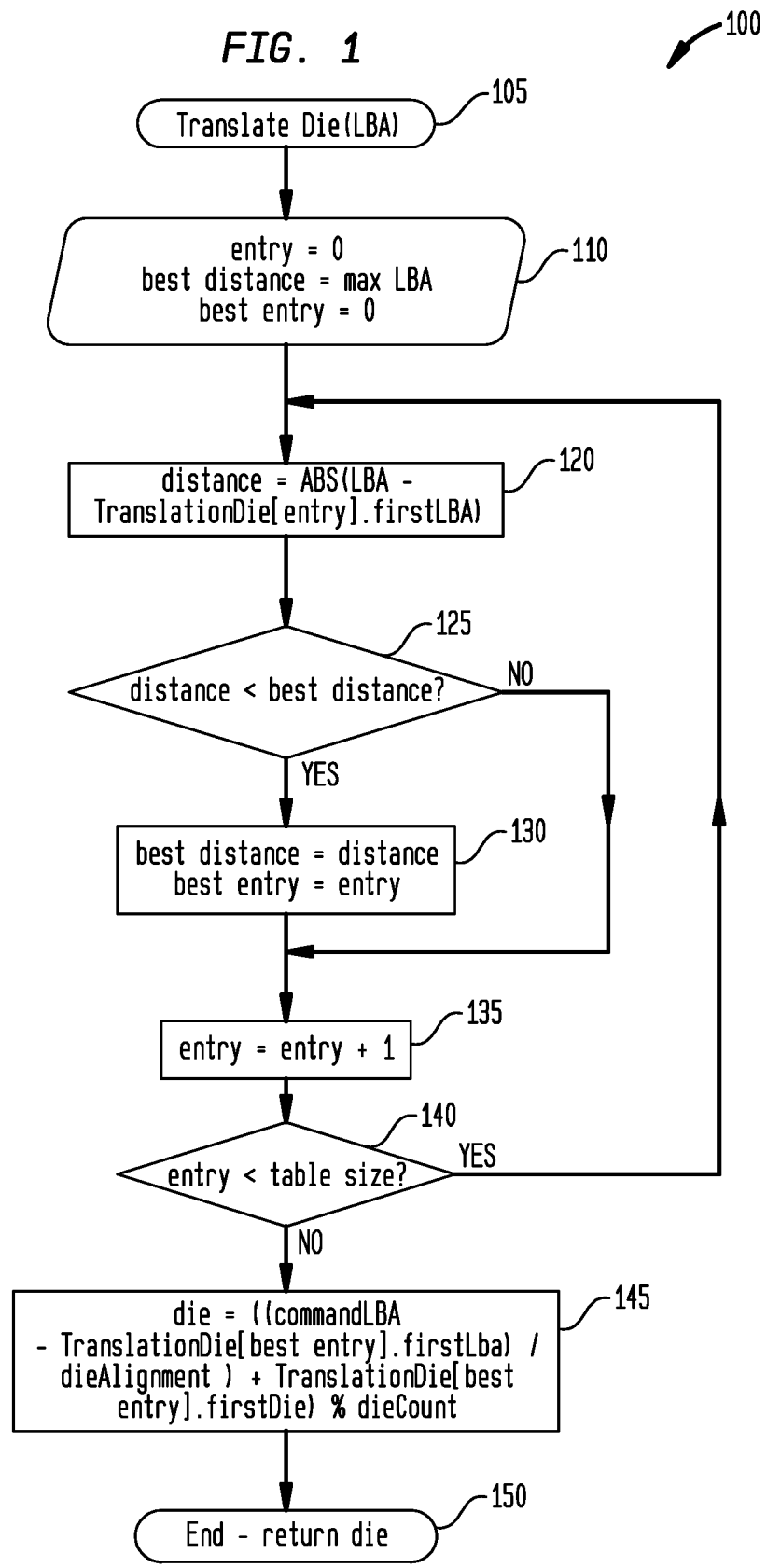
FIG. 1 is a flow chart for translation of translation of data of a logical based address to determine an appropriate die for writing.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art that some embodiments may be practiced without many of these details and that numerous variations or modifications from the described embodiments are possible. As used herein, the terms "above" and "below", "up" and "down", "upper" and "lower", "upwardly" and "downwardly", and other like terms indicating relative positions above or below a given point or element are used in this description to more clearly describe certain embodiments.

An embodiment of the current disclosure seeks to increase the parallelism of operations for dies in a storage device wherein, for example, read commands may be scheduled for times when a die is idled. As it is required to know which a die is scheduled to receive streams of data, a full translation could be performed for each set of data so that the exact die number is known prior to command placement to the die. Performing such extensive translations, however, can be time and calculation intensive for the system. In an alternative embodiment, and as an aspect described herein, the activity of a specific die being used for a given piece of data is estimated using a formula and translations table. As only the die is needed to be known, full translations are not needed to be known.

In an effort to maintain maximum efficiency for operations, a die translation is provided for development of a scheduling order of QD commands. As described above, a full or partial translation of the data may be obtained. In one example embodiment, a partial translation of the data is obtained as such a translation is more efficient in processing. The desired data in the translation is the appropriate die number for which future activities are to be performed. For purposes of overall computer efficiency, it is necessary to obtain a correct die translation for data. If such a die is successfully chosen, efficiency gains for the commands are high if multiple dies operate together on requests at one time.

The following definitions are provided:

dieAlignment: the amount of the logical based address written to a die before switching to the next die. The dieAlignment may also be known as the die page size or a meta page size of a die. The value of dieAlignment is calculated according to the geometry of the storage medium used. The block type, whether the storage is single level cell (SLC), triple level cell (TLC), (or some other cell variant) and the amount of blocks used in parallel within the die. The dieAlignment variable may also be used for write operations. The dieAlignment variable for read applications is used in the same way as the dieAlignment variable is used in write operations. The measurement unit for the dieAlignment variable is in logical based address units. This parameter is obtained from a die translation table/map entry.

dieCount is defined as the amount of dies in the storage device where each die can operate one operation at a time. In a storage device where a die can operate n read operations in parallel this number should be a multiple of the value of n.

The die translation table is a list of entries, where each entry contains the variables: firstLba, lastLba, firstDie.

The numerical value of firstLba is defined as a given logical based address, which has a first physical based address in a physical die page. The value of firstLba is obtained from a die translation table entry.

The value lastLba is defined as a given logical based address which represents the end boundary of the logical based address range.

The value firstDie is defined as the die number that corresponds to the firstLba. That is the physical die number where the LBA data is located. This parameter is obtained from a die translation table entry.

The die translation table entry range, as disclosed, can represent the entire media (set of data) if the entire media is written in sequential fashion. In the illustrated embodiment, the table is very effective in terms of ram size and can contain a large range of logical based addresses. In an example embodiment, whenever a logical based address is out of range of any of the table entries, extrapolation may be used to find the most closely existing range. In another non-limiting embodiment, for a correctly calculated die number, the table may be augmented to include any new ranges (i.e. logical based addresses that were extrapolated) that have been used.

Whenever a logical based address is in a range of a table entry, the die number is calculated as detailed below using a formula and table. If the estimated die number is incorrect, the specific table entry is separated into two ranges where a new range is with the correct die alignment. As can be seen, successive incorrect estimations will eventually correct the table and provide better results.

Heuristic approaches may be used or extended to build the ranges in the table and to also improve stable ranges along the read activity. Thus, such self-learning capabilities may be used to limit mistakes discovered over time to increase the accuracy of the overall estimation of the die number. When write operations occur and a stream of data is detected, the range of the data stream may be inserted to the table and it may also be considered as resident. The data, thus, over time, may become more accurate.

In an attempt to make the data more accurate, when garbage collection operations occur, the table can also be updated accordingly. In embodiments, the die translation table is different from a full translation table and/or a compressed translation by the following aspects:

A die translation table is an estimation based on different sources of data. In the embodiments disclosed, a value of >80% accuracy is targeted for correct die estimation. For a single input/output random write of a logical based address, the die translation table does not necessarily need to split (update) a table entry in the event of an incorrect die estimation. In embodiments, it is more economical to keep an effective table size, wherein a smaller table size can yield faster processing. Keeping a small but potentially inaccurate tale is contrary to the use of compressed translation tables, where 100% accuracy is a requirement, and a table split must occur in order for estimation to be accurately performed in future activities.

The full translation table must be tightly coupled with the write operation and should also check the latest updates of the table in order to maintain 100% accuracy. Scan of latest updates and deviations (i.e., a delta list) must take place in the full translation table. Such scans and delta list deviations are not necessary to be performed for the die translation table. A die translation table may be created at the outset that may be economical and practical for die translations purposes, alleviating the need for providing system updates. In other embodiments, however, updates could be provided to a die translation table eliminating the need for extrapolation of data ranges, if such data ranges are already created and would be helpful in future processing. As stated above, however, maintaining a small die translation table provides for compact processing and having a very large die translation table may be inefficient.

In die translation tables, a single entry can cover the entire media when such data is written in sequential order. As a result, a particularly large amount of data can be identified swiftly by knowing a single die entry. A full translation table must include the block numbers of the data. Die translations tables, therefore, are much more efficient for use in such types of processing.

A method is next described for performing the necessary calculations and table look-ups to properly estimate the die upon which future activities should be scheduled. Based on a given die translation table, it is assumed that the write operation of the logical block address where performed, is done in a sequential manner, therefore the die index of another logical based address can be calculated according to a given logical based address die translation entry where the command logical based address is within the entry range. The die alignment is also used as an input into calculations as well as the number of dies. The method is equally effective on data that has been defragmented, thereby providing large undisturbed blocks of data that may be identified by a single entry.

The parameters used for performing the necessary calculations are discussed below to provide the reader with information on how calculations are achieved:

Reminder Operator [%]: The result of this operator is the mathematical remainder of a mathematical divide operation between the operands. It is the remainder operation known in ANSI C coding language standard.

Divide Operator [/]: Mathematical Divide operator where the reminder is detached from the result. It is the reminder operation known in ANSI C coding language standard.

commandLBA: a given logical block address of a command in the QD. The calculation estimates a physical block address.

commandDie: the calculation final result and the die at which the storage device activity will occur. The estimated die index of the command in storage. The scheduler ordering is based on the result obtained from the commandDie formula:

$$commandDie = (((commandLBA - firstLba)/dieAlignment) + firstDie) \% dieCount$$

A numerical example is provided for ease of understanding the results of such calculations:
Die Translation Entry Parameters:
firstLba=756
lastLba=971
firstDie=3
Storage Device System Parameter:
dieAlignment=24
dieCount=4
Command Parameter:
command LBA=816
The calculation is performed as illustrated below:

commandDie=(((816−756)/24)+3) % 4=(60/24+3) % 4=(2+3) % 4=1

Command die for LBA 816 is die index 1, that is the $2^{nd}$ die in the storage as the first die is labeled as die 0.

The calculation is based on an assumption of a previously performed sequential write operation. In the example, the assumption is that the data in the storage locations are positioned as follows:

TABLE 1

| page number | Die 0 | | Die 1 | | Die 2 | | Die 3 | |
|---|---|---|---|---|---|---|---|---|
| | Start LBA | End LBA | Start LBA | End LBA | Start LBA | End LBA | Start LBA | End LBA |
| 16 | 396 | 419 | 420 | 443 | 444 | 467 | 468 | 491 |
| 17 | 492 | 515 | 516 | 539 | 540 | 563 | 564 | 587 |
| 18 | 588 | 611 | 612 | 635 | 636 | 659 | 660 | 683 |
| 19 | 684 | 707 | 708 | 731 | 732 | 755 | 756 (translatedFirstLba) | 779 |
| 20 | 780 | 803 | 804 | 827 | 828 | 851 | 852 | 875 |
| 21 | 876 | 899 | 900 | 923 | 924 | 947 | 948 | 971 |

The logical based address location in storage, provided above in Table 1, indicates that the data was most likely written sequentially or an internal defrag operation was performed on the data such that the data is recorded in a sequential manner. The die translation entry expressly sequentially started on page 19, die 3 where firstLba is 756 and finished at page 21 die 3. The die page size is 24 units (the difference between the first Lba 756 and the first LBA for page 20 LBA280, therefore the first LBA in the next die starts exactly 24 LBA's after the current die firstLba. This is the die page size or the dieAlignment previously recited.

The calculation results in a die number, which is then used by the storage device scheduler, for performance increase, namely to send information to a die when the die is idle so parallel actions may be undertaken at a number of dies. The flow for scheduling, by the storage device scheduler, may be a round robin type of schedule between the dies where the storage device request different die every time, trying to maximize the parallelism. For the purposes of definition, the round robin type of schedule dictates an equal amount of time (time slice) to each process in a circular order with all processes receiving the same priority. The process may be performed several times to identify several activities and to ascertain if a single die is used or multiple dies are involved with activities. For dies that are not being used, other computer activities may be performed on these dies for the sake of efficiency.

Whenever there is no command for a specific die according to the round robin type of scheduling, the next successive die may be scheduled. Alternative scheduling models may be used such as scheduling by request. Each die that becomes available may be determined to be "pending an operation request" to the scheduler queue and flash management will request commands be sent to respective dies according to a first in/first out queue. Using such a first in/first out queue maintains dies in a series of actions, greatly increasing the potential for parallel operations.

One non-limiting embodiment uses a Host Interface Module (HIM) that can maintain a queue for every die in the host command level, allowing the storage device to schedule operations depending on the die translation table. By using the HIM, such operations can improve random read performance for example, by ordering the execution queue according to a round robin technique between the queues scheme.

As will be apparent, the value of the estimation of the die for the function to be performed is dependent on several factors, such as starting and ending LBA values. The starting and ending LBA values illustrated in Table 1 are merely illustrative and will change according to storage capacities, number of dies, etc. The illustrated embodiment, therefore, should not be considered limiting.

To discuss the materials more completely, in one non-limiting embodiment, a method 100 is illustrated in FIG. 1. The method 100 is used to estimate which die would be used for operations. At 105, a translation of a die based upon a logical based address occurs. At 110, the value of entry is set to 0, the value of best distance is set equal to the value of the maximum logical based address and the value best entry is set to 0. The method proceeds to step 120 where the value of distance is set to ABS(LBA−TranslationDie[entry].first-LBA). The method proceeds to step 125 where a query is performed if the value of distance (calculated in step 120) is less than the value of best distance (originally set to max LBA in Table 1). If the value of distance is not less than best distance, the method proceeds to step 135. If the value of distance is less than the value of best distance, then the value of best distance is set equal to distance and the value of best entry is set equal to entry at 130. The method then proceeds to 135 wherein the value of entry is increased as a counter step. The method then proceeds to 140 where a query is performed to determine if the value of entry is less than the value of table size (i.e., is the value of entry lower than the table of values placed in Table 1). If the value of entry is less than table size, then the method returns to 120 as the value is too low. If the value of entry is not less than the value of table size (i.e., the entry value is within the table and the table applies), then at 145 the die is given by:

commandDie=(((commandLBA−firstLba)/dieAlignment)+firstDie) % dieCount

The method 100 may then end at step 150.

Figure 2:
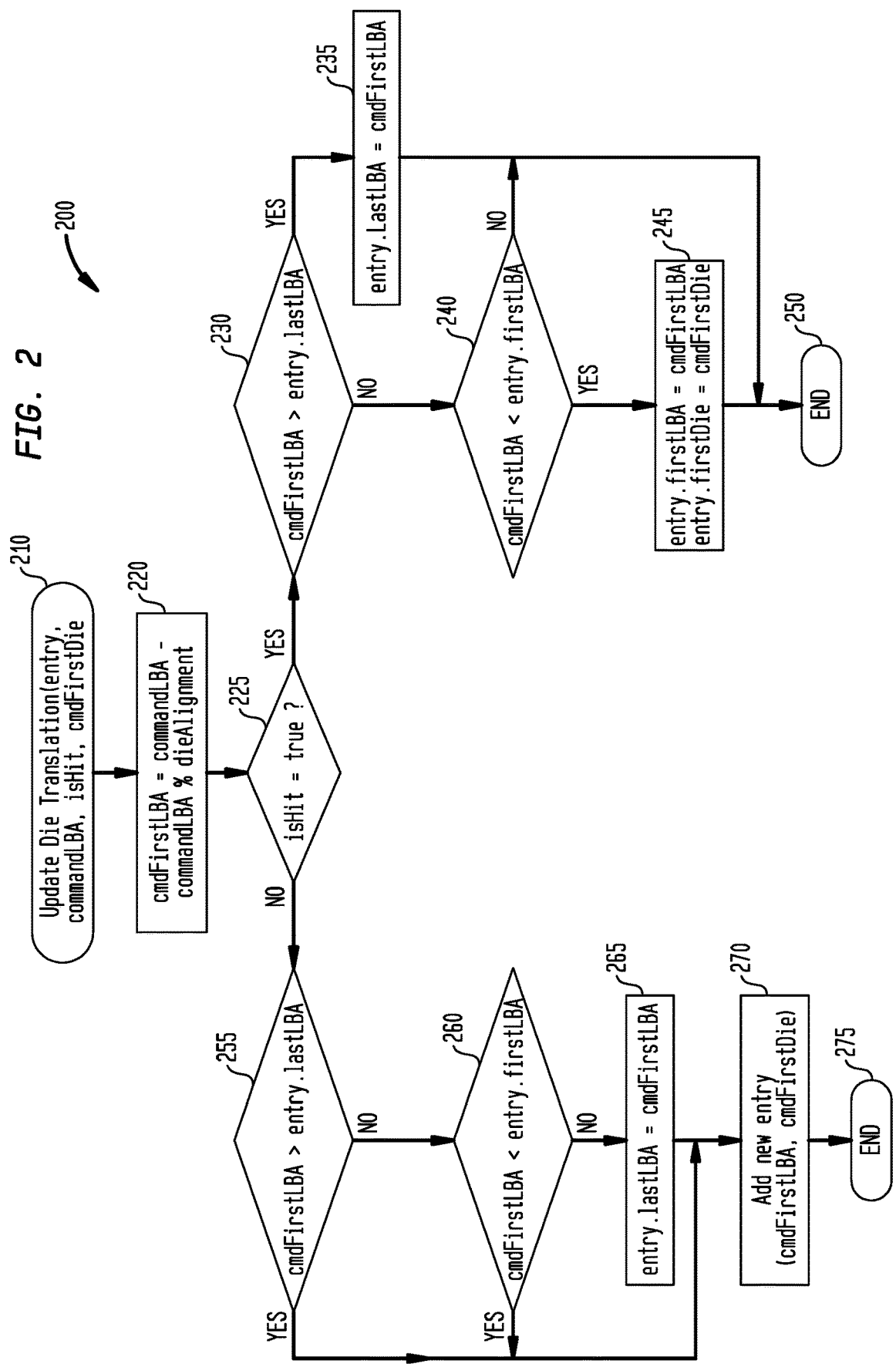
FIG. 2 is a flow chart for updating a die translation.

Referring to FIG. 2, a method 200 is provided for updating a die translation table. As illustrated, the method 200 is merely an example method. The method starts at 210 and proceeds to step 220 where the value of cmdFirstLBA=commandLBA−commandLBA % dieAlignment.

At 225, a query is run to determine if the value isHit=true (is the value within the table and does the table need to be expanded). If the query is true, the method progresses to 230 where the table must be expanded (either to higher values or lower values). If the query is false, the method progresses to step 255 (the values are within the table). At 255, a query is run to check if cmdFirstLBA>entry.lastLBA (are the values higher than the top value of a section). If the query is true at 255 (the value is low in range), the method proceeds to 270 where a new entry is added (cmdFirstLBA,cmdFirstDIE). If the query is not true at 255 then a query is run at 260 to determine if cmdFirstLBA<entry.firstLBA. If the query is true at 260, then the method proceeds to 270. If the query is not true at 260, then the value of entry.lastLBA is set equal to cmdFirstLBA (calculated in step 220) at 265. The method proceeds from 265 to 270 where a new entry is added Add New entry (cmdFirstLBA,cmdFirstDie). The method may then stop at 275.

If the query at 225 is true, (the table must be expanded) the method proceeds to 230 where a query is performed to check if cmdFirstLBA>entry.lastLBA. If the query at 230 is true, then the value of entry.LastLBA is set equal to cmdFirstLBA at 235 and the method ends at 250. If the query at 230 is false, then the method progresses to 240 where query checks if cmdFirstLBA<entry.firstLBA. If the query at 240 if false, the method ends at 250. If the query at 250 is true, then the value of entry.firstBA=cmdFirstLBA and entry.firstDie=cmdFirstDie at 245. The method then ends at 250.

Once the correct die is determined for a corresponding command, a scheduling unit, such as a controller or HIM, may tabulate the commands in a command queue and distribute the commands to respective die to have the die simultaneously process requests, thereby increasing the overall efficiency.

Referring to FIG. 3, a storage module 300 is illustrated. The storage module has a non-volatile memory 319 that interfaces with a memory interface 317 on a controller 318. The controller 318 has a CPU 313 that is configured to perform necessary calculations required by a host (not shown) through a host interface 312. An arrangement of ROM 316 is present for operational use by the CPU 313. The controller 318 may also be configured with an arrangement of RAM 315 as well as a crypto arrangement 314.

In one non-limiting embodiment, a method for performing a storage device operation on a die is disclosed comprising choosing a storage device operation to perform, estimating which die is related to the storage device operation chosen to be performed and performing the operation at the die based on the estimating.

In another non-limiting embodiment, the method may be accomplished wherein the storage device operation is a write operation.

In another non-limiting embodiment, the method may be accomplished wherein the estimating of the die is based on table of starting logical based addresses and ending logical based addresses and page numbers and a formula.

In another non-limiting embodiment, the method may be accomplished wherein estimating is performed on an assumption of sequential operations of dies.

In another non-limiting embodiment, the method may be accomplished wherein the formula is: commandDie= (((commandLBA−firstLba)/dieAlignment)+firstDie) % dieCount.

In another non-limiting embodiment, the method may be accomplished having steps of choosing a storage device operation to perform, estimating which die is related to the storage device operation chosen to be performed and checking if the die estimated for the operation is idle.

In another non-limiting embodiment, the method may further comprise sending instructions for the storage device operation at the die to be executed when the die is scheduled to be idle.

In another non-limiting embodiment, the method may further comprise waiting to send instructions for the storage device operation at the die when the die is not idle.

In another non-limiting embodiment, the method may be accomplished wherein the storage device operation is a read operation.

In another non-limiting embodiment, the method may be accomplished wherein the estimating of the die is based on table of starting logical based addresses and ending logical based addresses and page numbers and a formula.

In another non-limiting embodiment, a method to estimate a die value used for completion of a storage device request for a set of data having an entry value, a best distance value and a best entry value is disclosed having steps of calculating a distance of the set of data to end values in a die table, comparing the distance calculated to the best distance value, setting the best distance value equal to the distance value when the distance of the set of data is less than the best distance value, setting the best entry value equal to the entry value when the distance is less than the best distance value, comparing the entry value to a table size, repeating the calculation of the distance value when the entry value is less than the table size and calculating the die value of the set of data according to a formula.

In another non-limiting embodiment, the method may be accomplished wherein the storage device request is a write request.

In another non-limiting embodiment, the method may further comprise obtaining a table size from a memory of the storage device.

In another non-limiting embodiment, the method may be accomplished wherein the formula is commandDie=(((commandLBA−firstLba)/dieAlignment)+firstDie) % dieCount.

In another non-limiting embodiment, the method may be accomplished wherein the distance of the set of data is calculated by a formula of ABS(LBA−TranslationDie[entry].firstLBA).

In another non-limiting embodiment, an apparatus for performing a storage device operation on a die is disclosed comprising: means for choosing a storage device operation to perform, means for estimating which die is related to the storage device operation chosen to be performed and means for performing the storage device operation at the die based on the estimating.

In another non-limiting a method for updating a die translation table in a memory of a storage device, is disclosed, comprising steps of obtaining set of values pertaining to a set of data for updating to a die translation table, wherein the set of values includes an entry value, a command LBA value, an isHit value, and a cmdFirstDie value, obtaining a dieAlignment value of the die translation table, setting a value of cmdFirstLBA equal to the command LBA value−commandLBA % dieAlignment, comparing the isHit value to a true value, comparing the cmdFirstLBA to entry.lastLBA and adding a new entry to the die translation table in the memory of the storage device of the cmdFirstLBA and cmdFirstDie when a value of the cmdFirstLBA is greater than the entry.lastLBA.

In another non-limiting embodiment, a method for updating a die translation table in a memory of a storage device is disclosed comprising obtaining a set of values pertaining to a set of data for updating to a die translation table, wherein the set of values includes an entry value, a command LBA value, an isHit value, and a cmdFirstDie value, obtaining a dieAlignment value of the die translation table, setting a value of cmdFirstLBA equal to the command LBA value–commandLBA % dieAlignment, comparing the isHit value to a true value, comparing the cmdFirstLBA to entry.lastLBA, comparing the value cmdFirstLBA to entry.firstLBA, setting the value of entry.firstLBA equal to cmdFirstLBA when the cmdFirstLBA is not less than the value of entry.firstLBA and adding a new entry to the die translation table in the memory of the storage device of the cmdFirstLBA and cmdFirstDie.

In another non-limiting embodiment a method for updating a die translation table in a memory of a storage device, is disclosed, having steps of obtaining set of values pertaining to a set of data for updating to a die translation table, wherein the set of values includes an entry value, a command LBA value, an isHit value, and a cmdFirstDie value, obtaining a dieAlignment value of the die translation table, setting a value of cmdFirstLBA equal to the command LBA value–commandLBA % dieAlignment, comparing the isHit value to a true value, comparing the cmdFirstLBA value to a value of entry.lastLBA and setting a value of entry.LastLBA equal to cmdFirstLBA when CMDFirst LBA is greater than entry.lastLBA and the isHit value equals the true value; and updating the die translation table in the storage device memory with at least the entry.LastLBA.

In another non-limiting embodiment, a method for updating a die translation table in a memory of a storage device is disclosed comprising obtaining set of values pertaining to a set of data for updating to a die translation table, wherein the set of values includes an entry value, a command LBA value, an isHit value, and a cmdFirstDie value, obtaining a dieAlignment value for the die translation table, setting a value of cmdFirstLBA equal to the command LBA value–commandLBA % dieAlignment, comparing the isHit value to a true value, comparing the cmdFirstLBA to entry.lastLBA when the isHit value is true, comparing the value of cmdFirstLBA with entry.firstLBA when the isHit value is true, setting the value of entry.firstLBA equal to cmdFirstLBA and entry.firstDie equal to cmdFirstDie when cmdFirstLBA is less than the value of entry.firstLBA when the isHit value is true and updating the die translation table in the memory of the storage device with the entry.firstLBA and entry.firstDie values.

While embodiments have been described herein, those skilled in the art, having benefit of this disclosure will appreciate that other embodiments are envisioned that do not depart from the inventive scope of the present application. Accordingly, the scope of the present claims or any subsequent related claims shall not be unduly limited by the description of the embodiments described herein.

What is claimed is:

1. A method for updating a die translation table in a memory of a storage device, comprising:
    obtaining a set of values pertaining to a set of data for updating to the die translation table, wherein the set of values includes an entry value, a command logical block address (LBA) value, an isHit value, and a cmdFirstDie value;
    obtaining a dieAlignment value of the die translation table;
    setting a value of cmdFirstLBA, wherein the value of the cmdFirstLBA is set using a formula, and wherein the formula is: cmdFirstLBA=commandLBA−commandLBA % dieAlignment;
    comparing the isHit value to a true value; and
    comparing the cmdFirstLBA value to an entry.lastLBA value.

2. The method of claim 1, further comprising:
    adding a new entry to the die translation table in the memory of the storage device when the value of the cmdFirstLBA is greater than the entry.lastLBA value, and wherein the new entry includes the cmdFirstLBA value and cmdFirstDie value.

3. The method of claim 1, wherein the method for updating occurs during a write operation.

4. The method of claim 1, wherein the method for updating occurs during a read operation.

5. The method of claim 1, further comprising:
    comparing the cmdFirstLBA value to the entry.lastLBA value;
    comparing the value cmdFirstLBA to an entry.firstLBA;
    setting the value of entry.firstLBA equal to cmdFirstLBA when the cmdFirstLBA value is not less than the value of entry.firstLBA; and
    adding a new entry to the die translation table in the memory of the storage device, wherein the new entry includes the cmdFirstLBA value and the cmdFirstDie value.

6. The method of claim 1, further comprising:
    setting the value of the entry.LastLBA equal to the cmdFirstLBA value when the cmdFirstLBA value is greater than the entry.lastLBA value and the isHit value equals the true value; and
    updating the die translation table in the storage device memory with at least the entry.LastLBA value.

7. The method of claim 1, further comprising:
    comparing the value of cmdFirstLBA with an entry.firstLBA value when the isHit value is true;
    setting the value of the entry.firstLBA value equal to the cmdFirstLBA value and the entry.firstDie value equal to the cmdFirstDie value when the cmdFirstLBA value is less than the value of entry.firstLBA when the isHit value is true; and
    updating the die translation table in the memory of the storage device with the entry.firstLBA and entry.firstDie values.

8. The method according to claim 7, further comprising storing the updated die translation table in non-volatile memory.

9. A storage module, comprising:
    a controller configured to:
        choose a storage device operation to perform;
        estimate which die is related to the storage device operation chosen to be performed based on a look-up table and a formula using a die alignment, a logical based address and a die count; and
        perform the storage device operation at the die based on the estimating.

10. The storage module according to claim 9, wherein the storage device operation is a write operation.

11. The storage module according to claim 9, wherein the estimating is additionally performed on an assumption of sequential operations of dies.

12. The storage module according to claim 9, wherein the formula is:

$$commandDie=(((commandLBA-firstLba)/dieAlignment)+firstDie) \% dieCount.$$

13. A storage module, comprising:
a controller configured to:
- choose a storage device operation to perform;
- estimate which die is related to the storage device operation chosen to be performed based on a look-up table and a formula; and
- check a die estimated for the storage device operation to determine an idle state.

14. The storage module according to claim 13, further comprising:
sending instructions for the storage device operation at the die to be executed when the die estimated for the storage device operation is scheduled to be idle.

15. The storage module according to claim 13, further comprising:
waiting to send instructions for the storage device operation at the die estimated for the storage device operation when the die estimated for the storage device operation is not idle.

16. The storage module according to claim 13, wherein the storage device operation is a read operation.

17. The storage module according to claim 13, wherein the estimating of the die is also based on a table of starting logical based addresses and ending logical based addresses and page numbers.

* * * * *